United States Patent
Krishnamoorthy et al.

(10) Patent No.: US 12,213,026 B2
(45) Date of Patent: Jan. 28, 2025

(54) LOCATION UPDATE OPTIMIZATIONS FOR INTRA-PLMN MULTI-SIM UES

(71) Applicant: QUALCOMM Incorporated, San Diego, CA (US)

(72) Inventors: Parthasarathy Krishnamoorthy, San Diego, CA (US); Tao Luo, San Diego, CA (US); Ozcan Ozturk, San Diego, CA (US); Ruiming Zheng, Beijing (CN); Chetan Chakravarthy, San Diego, CA (US); Krishna Rao Mandadapu, San Diego, CA (US); Vijay Marwah, San Diego, CA (US); Ran Berliner, Kfar-Aviv (IL); Mueez Ahmad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/763,512

(22) PCT Filed: Nov. 12, 2019

(86) PCT No.: PCT/CN2019/117393
§ 371 (c)(1),
(2) Date: Mar. 24, 2022

(87) PCT Pub. No.: WO2021/092744
PCT Pub. Date: May 20, 2021

(65) Prior Publication Data
US 2022/0337975 A1    Oct. 20, 2022

(51) Int. Cl.
*H04W 4/029* (2018.01)
*H04W 8/18* (2009.01)
*H04W 88/06* (2009.01)

(52) U.S. Cl.
CPC ........... *H04W 4/029* (2018.02); *H04W 8/183* (2013.01); *H04W 88/06* (2013.01)

(58) Field of Classification Search
CPC . H04W 4/029; H04W 52/0251; H04W 60/04; H04W 8/183; H04W 88/06; Y02D 30/70
See application file for complete search history.

(56) References Cited

U.S. PATENT DOCUMENTS

| 2011/0077003 A1 | 3/2011 | Shin |
| 2017/0150545 A1 | 5/2017 | Ramkumar et al. |

(Continued)

FOREIGN PATENT DOCUMENTS

| CN | 110139362 A | * 8/2019 | ............ H04W 68/02 |
| CN | 110167087 A |   8/2019 | |

(Continued)

OTHER PUBLICATIONS

International Search Report and Written Opinion—PCT/CN2019/117393—ISA/EPO—Aug. 10, 2020.

(Continued)

*Primary Examiner* — Kashif Siddiqui
(74) *Attorney, Agent, or Firm* — Harrity & Harrity, LLP\Qualcomm

(57) ABSTRACT

A MSIM UE may perform network operations for each network subscription. However, if the MSIM UE employs subscriptions for the same network, these operations may be performed redundantly. By notifying the network of multiple subscriptions at the UE and associating the multiple subscriptions at the network, the present invention provides power-saving at the UE and reduces network signaling overhead by optimizing communication for MSIM UE. In an aspect of the disclosure, a method, a computer-readable medium, and an apparatus are provided. The apparatus may be configured to indicate to a network that the UE is (Continued)

associated with a plurality of network subscriptions, the plurality of network subscriptions including at least a first network subscription and a second network subscription, transmit location information using the first network subscription to the network, wherein the location information corresponds to a UE location, and receive data associated with the second subscription from the network.

26 Claims, 9 Drawing Sheets

(56) References Cited

U.S. PATENT DOCUMENTS

2018/0084504 A1* 3/2018 Lindoff .............. H04B 17/336
2020/0068547 A1* 2/2020 Li ..................... H04W 72/51

FOREIGN PATENT DOCUMENTS

CN 110313201 A 10/2019
CN 110431863 A 11/2019

OTHER PUBLICATIONS

Supplementary European Search Report—19952157—Search Authority—Munich—Jul. 3, 2023.

* cited by examiner

LOCATION UPDATE OPTIMIZATIONS FOR INTRA-PLMN MULTI-SIM UES

BACKGROUND

Technical Field

The present disclosure relates generally to communication systems, and more particularly, to multi-SIM devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Multiple access technologies have been adopted in various telecommunication standards to provide a common protocol that enables different wireless devices to communicate on a municipal, national, regional, and even global level. An example telecommunication standard is 5G New Radio (NR).

5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

A Multiple Subscriber Identify Module (MSIM) capable User Equipment (UE) may operate in a connected mode on a first subscription with a first network while operating in an idle mode or an active mode on a second subscription. Such a MSIM UE may perform various network operations for each network subscription. However, if the MSIM UE employs subscriptions for the same network, these operations may be performed redundantly for each subscription. By notifying the network that the UE is employing multiple subscriptions for that same network, the network can reduce the need for redundant communications by the UE. Accordingly, the present invention provides power-saving at the UE and reduces network signaling overhead by optimizing communication for MSIM UE with multiple subscriptions for the same network.

In an aspect of the disclosure, a method, a computer-readable medium, and an apparatus are provided. The apparatus may by a UE. The apparatus may be configured to indicate to a network that the UE is associated with a plurality of network subscriptions, the plurality of network subscriptions including at least a first network subscription and a second network subscription, transmit location information using the first network subscription to the network, wherein the location information corresponds to a UE location, and receive data associated with the second subscription from the network, wherein the data is associated with the UE location. The UE may be a multi-SIM UE. The subscription indication may comprise a MAC CE or a RRC IE. The location information may be a first location information, and the apparatus may be further configured to transmit a second location information using the second network subscription, subsequent to transmitting the first location information, and receive data associated with the first subscription at the UE, wherein the data associated with the first subscription corresponds to the second location information.

In another aspect of the disclosure, a method, a computer-readable medium, and an apparatus are provided. The apparatus may by a network device. The apparatus may be configured receive a subscription indication from a UE, wherein the subscription indication identifies that the UE is associated with a plurality of network subscriptions, the plurality of network subscriptions including at least a first network subscription and a second network subscription, receive location information associated with the first network subscription from the UE, update location information associated with the second subscription based on the location information associated with the first network subscription, and transmit data associated with the second subscription to the UE, wherein the data corresponds to a UE location based on the updated location record. The plurality of network subscriptions may be associated with a UE device identity. The location record may be associated with the UE device identity. Additionally, the location information may be a first location information and the apparatus may be further configured to receive a second location information associated with the second network subscription from the UE, subsequent to receiving the first location information, and update the location information associated with the first subscription based on the second location information; and transmitting data associated with the first subscription to the UE, wherein the data corresponds to a UE location based on the updated location information corresponding to the second location information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
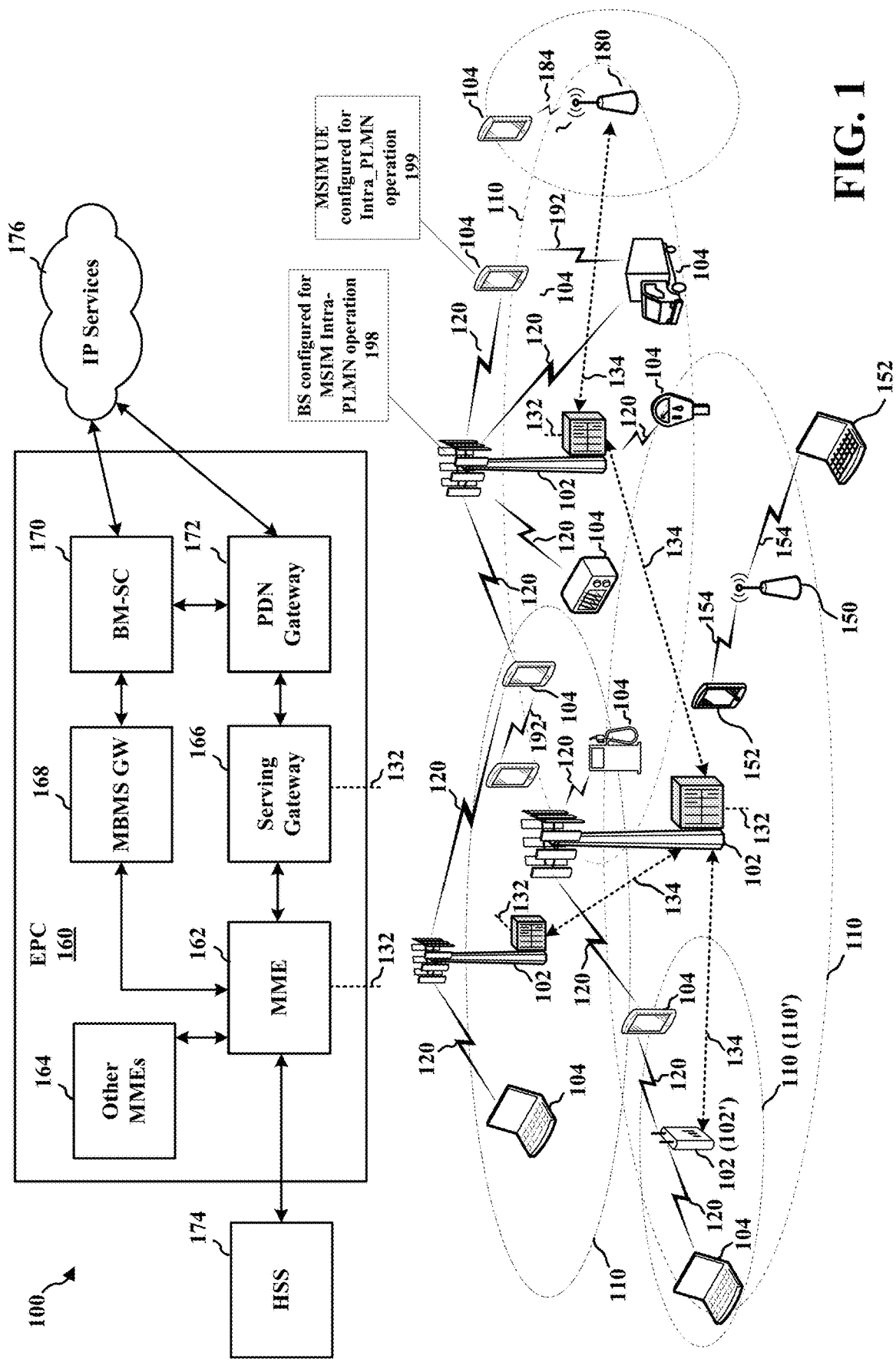
FIG. 1 is a diagram illustrating an example of a wireless communications system and an access network according to some embodiments.

The detailed description set forth below in connection with the appended drawings is intended as a description of various configurations and is not intended to represent the only configurations in which the concepts described herein may be practiced. The detailed description includes specific details to provide a thorough understanding of various concepts. However, it will be apparent to those skilled in the art that these concepts may be practiced without these specific details. In some instances, well-known structures and components are shown in block diagram form to avoid obscuring such concepts.

A Multiple Subscriber Identify Module (MSIM) capable User Equipment (UE) may operate in a connected mode on a first subscription with a first network while operating in an idle mode or an active mode on a second subscription. The MSIM UE may perform various network operations for each network subscription. However, when the MSIM UE employs subscriptions for the same network these operations may be performed redundantly for each subscription. By notifying the network that the UE is a MSIM Intra-PLMN UE, the network can reduce the need for redundant communications by the UE. Accordingly, the present invention provides power-saving at the UE and reduces network signaling overhead by optimizing communication for MSIM UE with multiple subscriptions for the same network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., an X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase the capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a prosthetic, medical device, entertainment device, industrial equipment, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be a MSIM UE configured for Intra-PLMN operation 199. Similarly, BS 102 may be a configured for MSIM Intra-PLMN operation 198.

Figure 2:
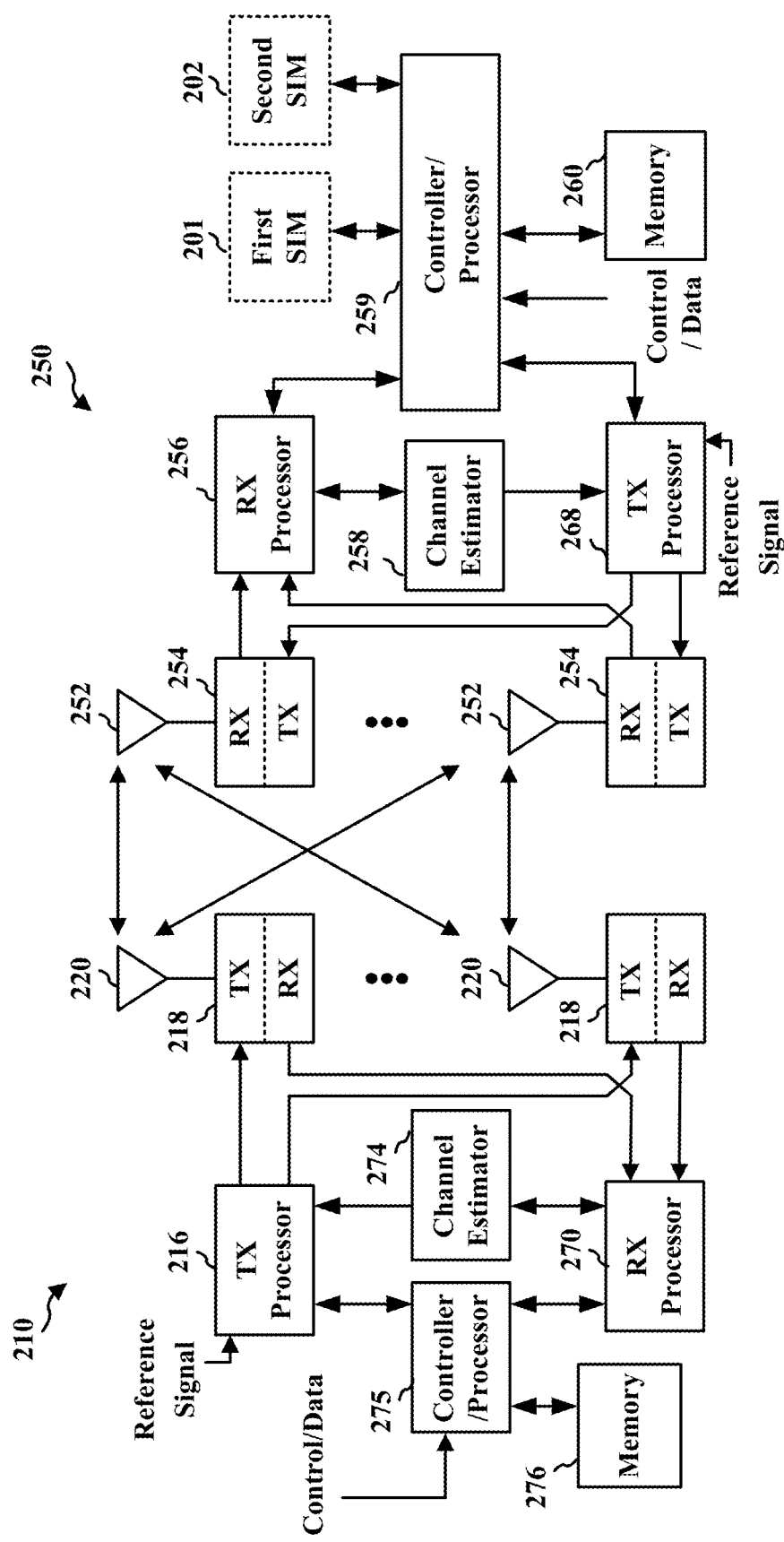
FIG. 2 is a diagram illustrating an example of a base station and user equipment (UE) in an access network according to some embodiments.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 2 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission.

The UL transmission is processed at the base station 210 similarly to the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

Various wireless communication technologies may have a different frame structure and/or different channels. A frame may be divided into multiple (e.g., 10) equally sized subframes. Each subframe may include multiple consecutive time slots (based on the type of numerology). A resource grid may be used to represent time slots, each time slot may include one or more time concurrent resource blocks (RBs) (also referred to as physical RBs (PRBs)). The resource grid is divided into multiple resource elements (REs). For a normal cyclic prefix, an RB may contain consecutive subcarriers in the frequency domain and consecutive symbols The number of bits carried by each RE depends on the modulation scheme.

Some of the REs may carry reference (pilot) signals (RS) for downlink channel estimation at the UE. These RS may include cell-specific reference signals (CRS) (also sometimes called common RS), UE-specific reference signals (UE-RS), and channel state information reference signals (CSI-RS).

Various channels may exist within a DL subframe. The PDCCH carries downlink control information (DCI) within one or more control channel elements (CCEs), each CCE including multiple RE groups (REGs), each REG including a number of consecutive REs in an OFDM symbol. A UE may be configured with a UE-specific enhanced PDCCH (ePDCCH) that also carries DCI. The physical hybrid automatic repeat request (ARQ) (HARQ) indicator channel (PHICH) carries the HARQ indicator (HI) that indicates HARQ acknowledgement (ACK)/negative ACK (NACK) feedback based on the success of decoding a physical uplink shared channel (PUSCH). A primary synchronization signal (PSS) may serve to determine subframe/symbol timing and a physical layer identity. A secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the downlink RS. A physical broadcast channel (PBCH), carries a master information block (MIB). The PBCH may be logically grouped with the PSS and SSS to form a synchronization signal (SS) block. The MIB provides system configuration information, including a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

Uplink subframes may include REs that carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

A physical random access channel (PRACH) may be within one or more subframes within a frame based on the PRACH configuration. The PRACH may include consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

A wireless communication device may include one or more subscriber identity modules (SIM) that provide access to one or multiple separate mobile communication networks that implement certain radio access technologies (RATs). Example UEs include, but are not limited to, mobile phones, laptop computers, smart phones, and other mobile communication devices of the like that are configured to connect to one or more RATs. These devices may have Multiple Subscriber Identity Module (MSIM) capability. FIG. 2, for example illustrates a UE having multiple SIMs (e.g., a first SIM 201 and a second SIM 202). Although two SIMs are illustrated, aspects described herein may be similarly applied to a device comprising more than two SIMs. Having multiple SIMs may enable a single device to use different numbers for voice calls or data plans. Multiple SIMs may enable the device to operate using more than one network subscription and/or more than one network. Such a wireless communication device may be capable of communicating over a variety of frequency bands, wireless communication systems (e.g., wide area network (WAN), Wireless Fidelity (Wi-Fi), or Near Field Communication (NFC)), and radio access technologies (RATs) within a WAN (e.g., 3GPP Long Term Evolution (LTE), 5G New Radio (NR), Global System for Mobility (GSM), and Wideband Code Division Multiple Access (WCDMA)). To use different frequency systems and/or radio access technologies, a wireless communication device may or may not include two or more radio transceivers.

As noted, a SIM enables the wireless communication device to access one or more communication networks (or one or more subscriber accounts on the same network). A SIM card may identify and authenticate a subscriber using a particular communication device, and the SIM card may be associated with a subscription. In various embodiments, the wireless communication device may also include one or more RF resource chains that may each be used for RF reception and transmission. As used herein, the terms "SIM," "SIM card," "subscriber identity module," and variants thereof are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information stored in a particular SIM, as the SIM and the communication network (as well as the services and subscriptions supported by that network) correlate to one another. Similarly, the term "subscription" may refer to a network subscription or service associated with a particular SIM.

In general, a wireless device that includes multiple SIMs and that can be connected to two or more separate (or same) RATs using a same set of transmission hardware (e.g., radio-frequency (RF) transceivers) is a multi-SIM-multi-standby (MSMS) communication device. In one example, the MSMS communication device may be a dual-SIM-dual-standby (DSDS) communication device, which may include two SIM cards/subscriptions that may on standby. However, only one SIM may be in active use, during which the other is on standby. In another example, the MSMS communication device may be a triple-SIM-triple-standby (TSTS) communication device, which includes three SIM cards/subscriptions that may all be on standby. In this example, two SIM may be deactivated or standby while the third one is in active use. In other examples, the MSMS communication device may be other suitable MSIM communication devices, with, for example, four or more SIMs, such that when one is in use, the others are on standby.

On the other hand, a wireless device with multiple SIMs that can connect to two or more separate (or same) RATs using two or more separate sets of transmission hardware is termed a multi-SIM-multi-active (MSMA) communication device. An example MSMA communication device is a dual-SIM-dual-active (DSDA) communication device, which includes two SIM cards/subscriptions. Both SIMs may remain active. In another example, the MSMA device may be a triple-SIM-triple-active (TSTA) communication device, which includes three SIM cards/subscriptions. All three SIMs may remain active. In other examples, the MSMA communication device may be other suitable multi-SIM communication devices with four or more SIMs, which may all be active.

By example, a common MSIM device may include a dual-SIM UE (such as DSDS or DSDA device). Such a MSIM UE may be a 5G+5G MSIM device (including two 5G SIMs corresponding to two 5G subscriptions) or 5G+4G MSIM device (including one 5G SIM and one LTE SIM corresponding to a 5G subscription and a 4G LTE subscription). In a common scenario, the MSIM UE may be configured with two SIMs for the same operator, e.g., a user may install one SIM for business/official and another SIM for personal use in a single UE hardware device. In such scenarios, both SIMs commonly correspond to the same network operator, a configuration referred to hereinafter as Intra-PLMN. A MSIM UE configured as Intra-PLMN, may perform redundant operations with the same network when initializing, configuring, and updating the respective network subscriptions associated with each SIM. Among the redundant operations that may be performed by the MSIM UE are tracking area updates (TAU) and RAN-based network area updates (RNAU).

Wireless communication systems employ one or more base stations that provide a coverage for an area. Area tracking within a wireless communication system enables a tracking area location for UE to be defined. Typically, a network can request or page the user equipment (UE) in which the UE can respond with the tracking area location. In LTE and 5G systems, the MME (or similar entity) is responsible for assigning Tracking Area (TA) to each registered UE. As a UE travels out of a TA it notifies the MME using a TAU. 5G additionally defines a RAN-based Notification Area (RNA), which is defined by a cell list of gNB that make up the RNA. As a UE travels out of a RNA, it reports its location change as a RNAU. A UE sends location-based signaling such or a RNAU or TAU for each active SIM as it moves to a new tracking or inactive area. In the MSIM Intra-PLMN scenario, TAU or RNAU are sent redundantly, i.e., one for each network subscription. Such transmissions are inefficient from both network capacity and UE power-savings perspectives because all the subscriptions relate to the same network and, therefore, the same TAs and RNAs.

Various aspects and embodiments described herein relate to, but are not limited to, a MSIM context such as the MSMS and MSMA contexts. For example, in the MSIM context, each subscription may be configured to acquire service from a base station (associated with a given cell). For clarity, various aspects and embodiments described hereinafter as an MSIM UE refer to a MSIM UE with two subscriptions to the same network operator (i.e., MSIM Intra-PLMN). However, a UE with three or more SIMs and three or more subscriptions may suitably implement various aspects and embodiments described herein. The MSIM UE may be a 5G+5G MSIM Intra-PLMN UE or 5G+4G MSIM Intra-PLMN UE including a first SIM and a second SIM. Furthermore, reference will be made to a first subscription associated with the first SIM and a second subscription associated with the second SIM. Both the first subscription and the second subscription are associated with the same cellular network. Additionally, while reference hereinafter is made to a dual-SIM device, the described concepts are equally applicable to multi-SIM Intra-PLMN devices that have three or more active SIMs and subscriptions.

A MSIM UE may perform various network operations redundantly for each subscription corresponding to each active SIM. These common network operations may include channel measurements, TAU, RNAU, as well as other operations. However, since all the SIMs in the device operate from within the same hardware/phone, they are located at the same location and measure similar network channel quality. Therefore, the subscriptions (associated with these SIMs) will generally attach to the same network base station. Accordingly, power-saving and network signaling overhead optimization may be possible by optimizing communication-based on the Intra-PLMN status of the MSIM UE.

In one aspect, the MSIM UE may indicate to the network that two subscriptions are active at the UE. For example, this indication may be signaled via either MAC CE or RRC IE. Every SIM will have a corresponding IMSI. The MSIM UE hardware will have a unique International Mobile Equipment Identity (IMEI). The IMEI is a unique code that identifies the hardware. The UE associates the IMSIs for the first SIM and the second SIM with the IMEI of the UE and communicates the association to the network via a MAC CE or RRC IE.

Based on the indication from the UE, the network records that both subscriptions (the first subscription and the second subscription) reside inside the same dual-Sim UE. Therefore, if any one of the subscriptions sends TAU or RNAU to the gNB the other subscription does not need to repeat the same update, as the gNB (or network entity) may leverage the TAU/RNAU information across any subscription associated with the IMEI. Accordingly, if subscription 1 sends a TAU or RNAU to the gNB, the second subscription does not need to perform the same update.

Figure 3:
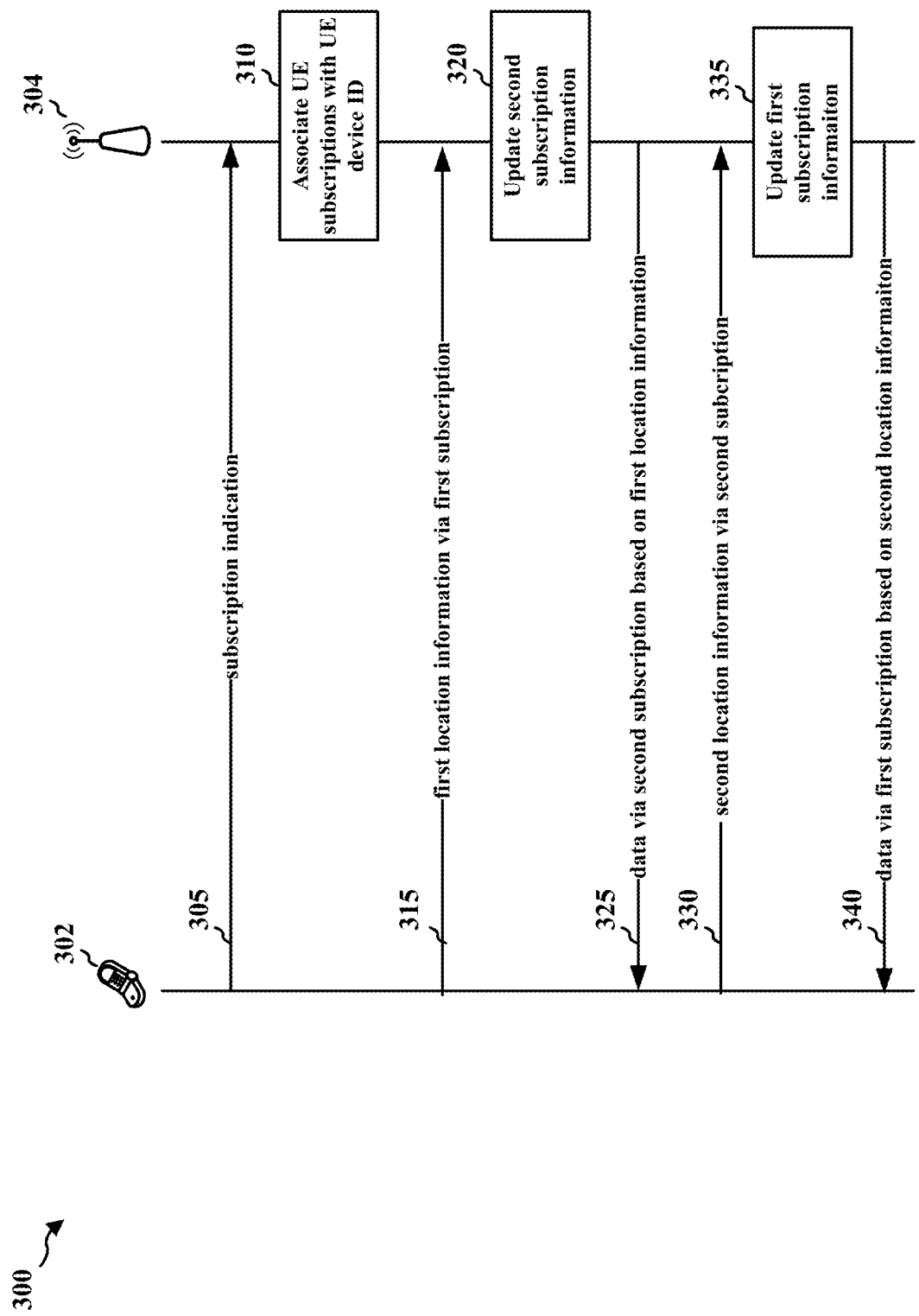
FIG. 3 is a communication diagram illustrating signaling and operations performed by a UE and a base station according to some embodiments.

FIG. 3 is a communication diagram 300 illustrating signaling and operations performed by a UE 302 and a base station 304. The base station 304 may be a gNB and may include an MME. Alternatively, base station 304 may represent network-elements communicating with UE 302. UE 302 may be a MSIM UE. The communication diagram illustrates an aspect of the invention, whereby the dual-SIM communication employs power-saving and network signaling overhead optimizations based on the dual-SIM Intra-PLMN status of UE 302.

At 305, the UE 302 may transmit a subscription indication to the base station 304 that two (or more) subscriptions are active at the UE 302. This subscription indication may be signaled via either MAC CE or RRC IE. The subscription indication may include a list of active subscriptions at the UE and a unique UE hardware identifier. For example, the list of active subscriptions may include a list of IMSIs and the unique UE hardware identifier may be an IMEI. The transmission of the subscription indication may be responsive to the UE activating or deactivating a SIM or entering or existing the coverage area of a network.

At 310, a network entity at the base station 304 or within the network, such as an MME, may associate the active subscriptions at the UE with the UE 302 based on the subscription indication. For example, the network entity may maintain a database or data context that associates one or more IMSIs with an IMEI.

At 315, UE 302 may transmit a first location information to base station 304 via the first subscription. The first location information may be a TAU or a RNAU. The TAU or RNAU may be transmitted using the first subscription associated with the first SIM. The transmission of the TAU or RNAU may be triggered by a network request or in response to a page by the network. Alternatively, the TAU or RNAU may be transmitted autonomously by the UE without a specific trigger from the network (e.g., the TAU or RNAU may be triggered by UE mobility, location, or a timer).

At 320, the base station 304 may update the second subscription information at the base station 304 based on the location information from 315. This is additional to updating the first subscription information based on the location information from 315. Accordingly, the base station 304 updates any active subscriptions associated with UE 302 based on the location information. The base station 204 may update the active subscriptions associated with UE 302 based on the subscription indication 305.

At 325, the base station 304 transmits data using the second subscription to UE 302. This data may be based on or associated with the first location information. For example, the data may be control data, such as a page or other location-dependent control signaling. Alternatively, the data may be application-related user data that employs location information.

Steps 330, 335, 340 serve to illustrate that location information from different subscriptions can update other subscriptions' location information.

At 330, UE 302 may transmit a second location information to base station 304 via the second subscription. The second location information may be a TAU or a RNAU. The TAU or RNAU may be transmitted using the second subscription associated with the second SIM. The transmission of the TAU or RNAU may be triggered by a network request or in response to a page by the network.

At 335, the base station 304 may update the first subscription information at the base station 304 based on the location information from 315. This is additional to updating the second subscription information based on the location information from 315. Accordingly, the base station 304 updates any active subscriptions associated with UE 302 based on the location information. The base station 304 may update the active subscriptions associated with UE 302 based on the subscription indication 305. Additionally, the UE may transmit subsequent subscription indications (not shown) if the status of SIM cards or subscriptions change at the UE 302 (e.g., a user removes, installs, activates, or deactivates a SIM card).

At 340, the base station 304 transmits data using the first subscription to UE 302. This data may be based on or associated with the first location information. For example, the data may be control data, such as a page or other location-dependent control signal. Alternatively, the data may be application-related user data that employs location information.

Figure 4:
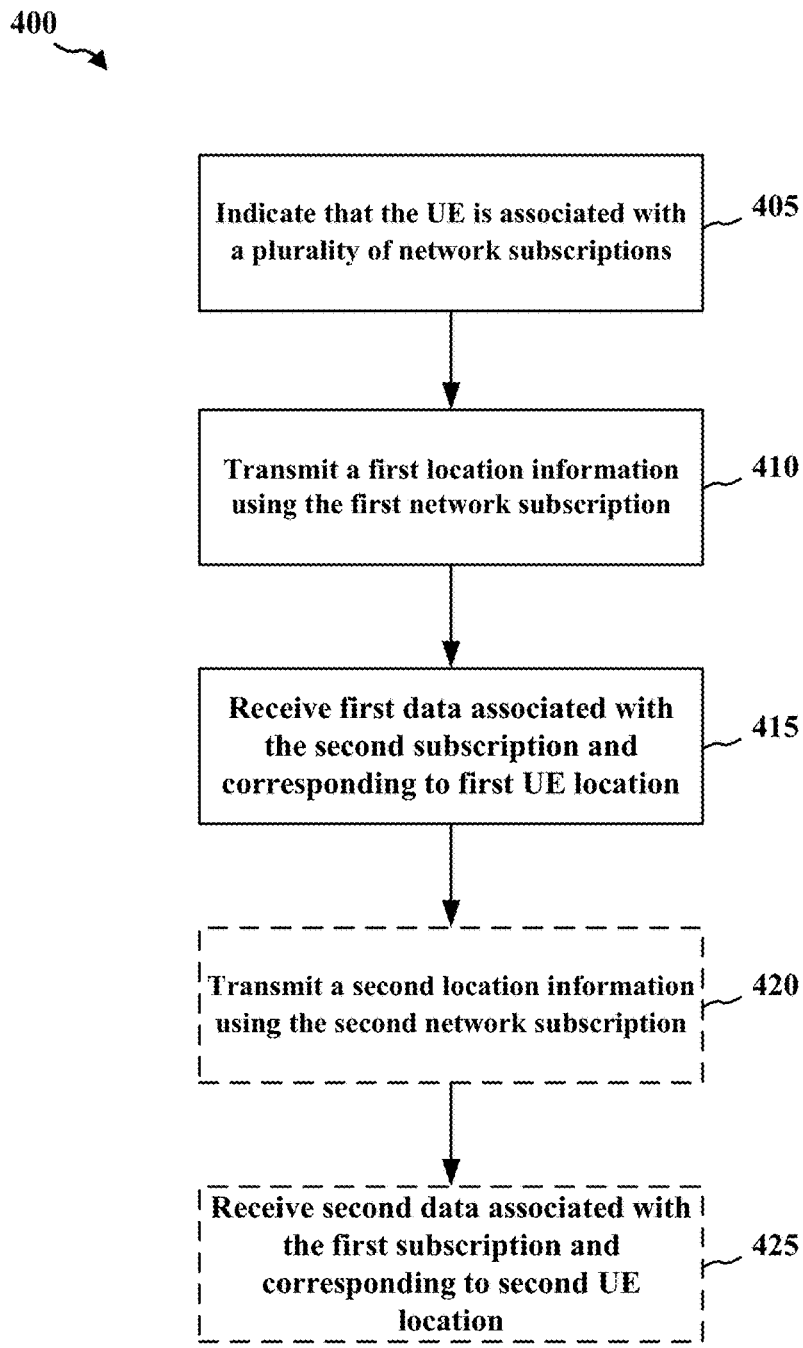
FIG. 4 is a flowchart of a method of wireless communication according to some embodiments.

FIG. 4 is a flowchart 400 of a method of wireless communication. The method may be performed by a UE (e.g., the UE 104, 250, 302; the apparatus 502/502'). The UE may be a dual-SIM Intra-PLMN UE. Optional aspects are illustrated with a dashed line. The method improves communication by a MSIM device by enabling a reduction in power consumption and overhead signaling.

At 405, the UE indicates that it is associated with a plurality of subscriptions. The plurality of subscriptions may include at least a first subscription and a second subscription. For example, the UE may transmit a subscription indication to a base station, as illustrated at 305 in FIG. 3. The subscription indication may be transmitted using either the first subscription or the second subscription and may be a MAC CE or RRC IE. The subscription indication may correlate a plurality of subscriptions to a single UE. The plurality of subscriptions may include at least a 5G subscription and one of an LTE subscription or another 5G subscription. Each of the plurality of subscriptions is associated with a unique subscriber identity (e.g., IMSI).

At 410, the UE may transmit a first location information using the first subscription. The location information may be a TAU or a RNAU. The TAU or RNAU may be transmitted using the first subscription. The TAU or RNAU may be triggered by a network request, occur in response to a page by the network, or be triggered by UE mobility. For example, the UE may transmit a first location information to the base station, as illustrated at 310 in FIG. 3.

At 415, the UE may receive first data associated with the second subscription. The data may correspond to first UE location. That is, while the first location information was transmitted using the first subscription, the network updates the UE location (e.g., a context) for second subscription (along with the UE location for the first subscription). For example, as illustrated at 315 in FIG. 3, the base station may send control data based on the first location.

At 420, the UE may transmit a second location information using the second subscription. The location information may be a TAU or a RNAU. The TAU or RNAU may be transmitted using the second subscription, and may be triggered by a network request, occur in response to a page by the network, or be triggered by UE mobility. For example, the UE may transmit a second location information to the gNB, as illustrated at 330 in FIG. 3.

At 425, the UE may receive second data associated with the first subscription. The data may correspond to a second UE location. That is, while the second location information was transmitted using the second subscription, the network updates the context for first subscription (along with the context for the second subscription). For example, as illustrated at 340 in FIG. 3, the base station may send control data based on the first location.

Figure 5:
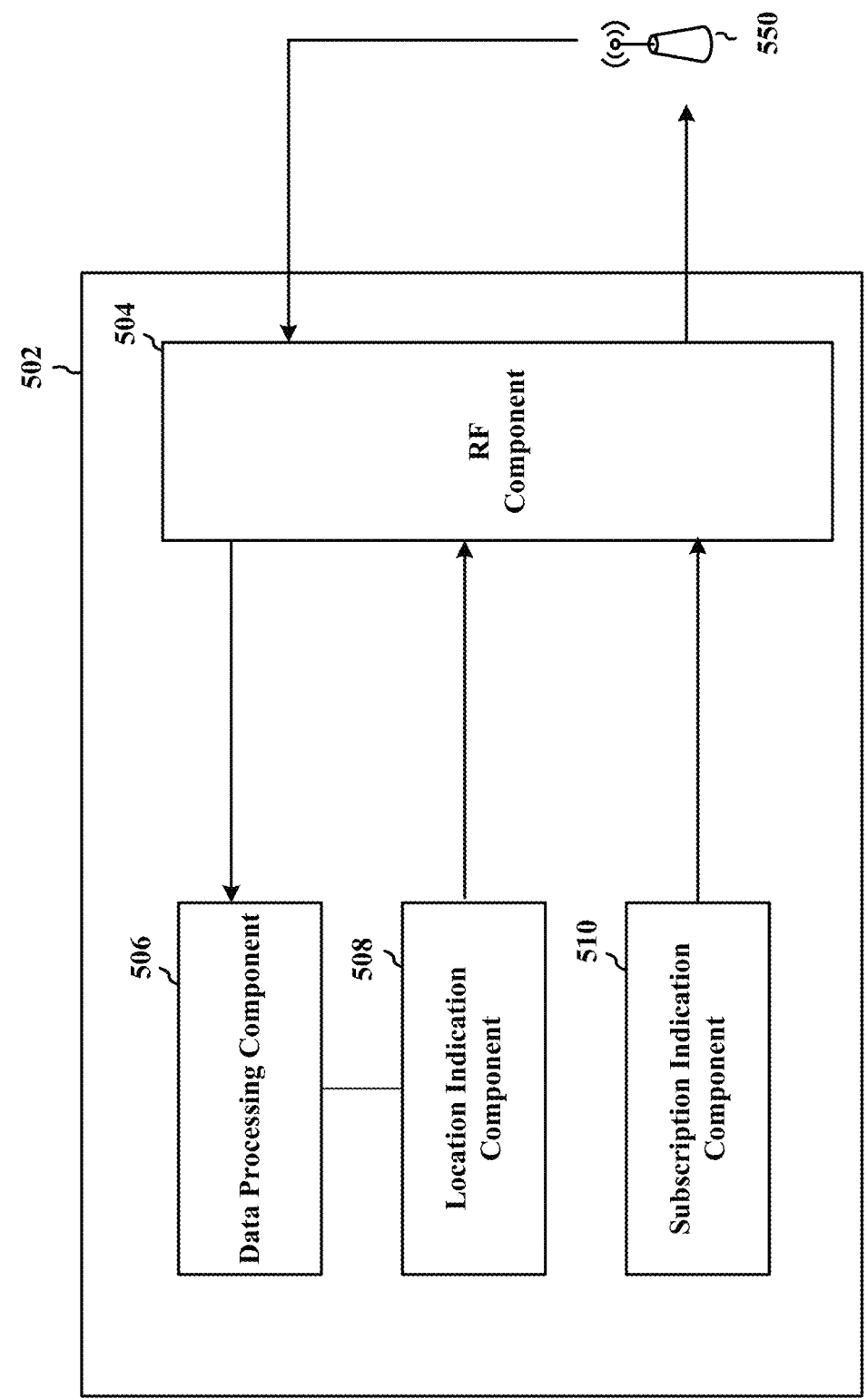
FIG. 5 is a conceptual data flow diagram illustrating the data flow between different means/components according to some embodiments.

FIG. 5 is a conceptual data flow diagram 500 illustrating the data flow between different means/components in an exemplary apparatus 502. The apparatus may be a UE. The apparatus includes an RF Component 504, Data Processing Component 506, Location Indication Component 508, and Subscription Indication Component 510. RF Component 504 receives control and user data from gNB 550. The control data may include paging transmission, TAU requests, RNAU requests. Data Processing Component 506 receives control and/or user data from RF component 504. For example, if Data Processing Component 506 receives a page of a TAU query from gNB 550, it may signal Location Indication Component 508 to transmit a TAU or RNAU. Location indication Component 508 transmits TAUs or RNAUs to gNB 550 via RF Component 502. Subscription Indication Component 510 may transmit a subscription indication to gNB 550 including the IMSI of any active subscription/SIM and the IMEI for apparatus 502.

The apparatus may include additional components that perform each of the blocks of the algorithm in the aforementioned flowcharts of FIG. 3. As such, each block in the aforementioned flowcharts of FIG. 3 may be performed by a component and the apparatus may include one or more of those components. The components may be one or more hardware components specifically configured to carry out the stated processes/algorithms, implemented by a processor configured to perform the stated processes/algorithms, stored within a computer-readable medium for implementation by a processor, or some combination thereof.

Figure 6:
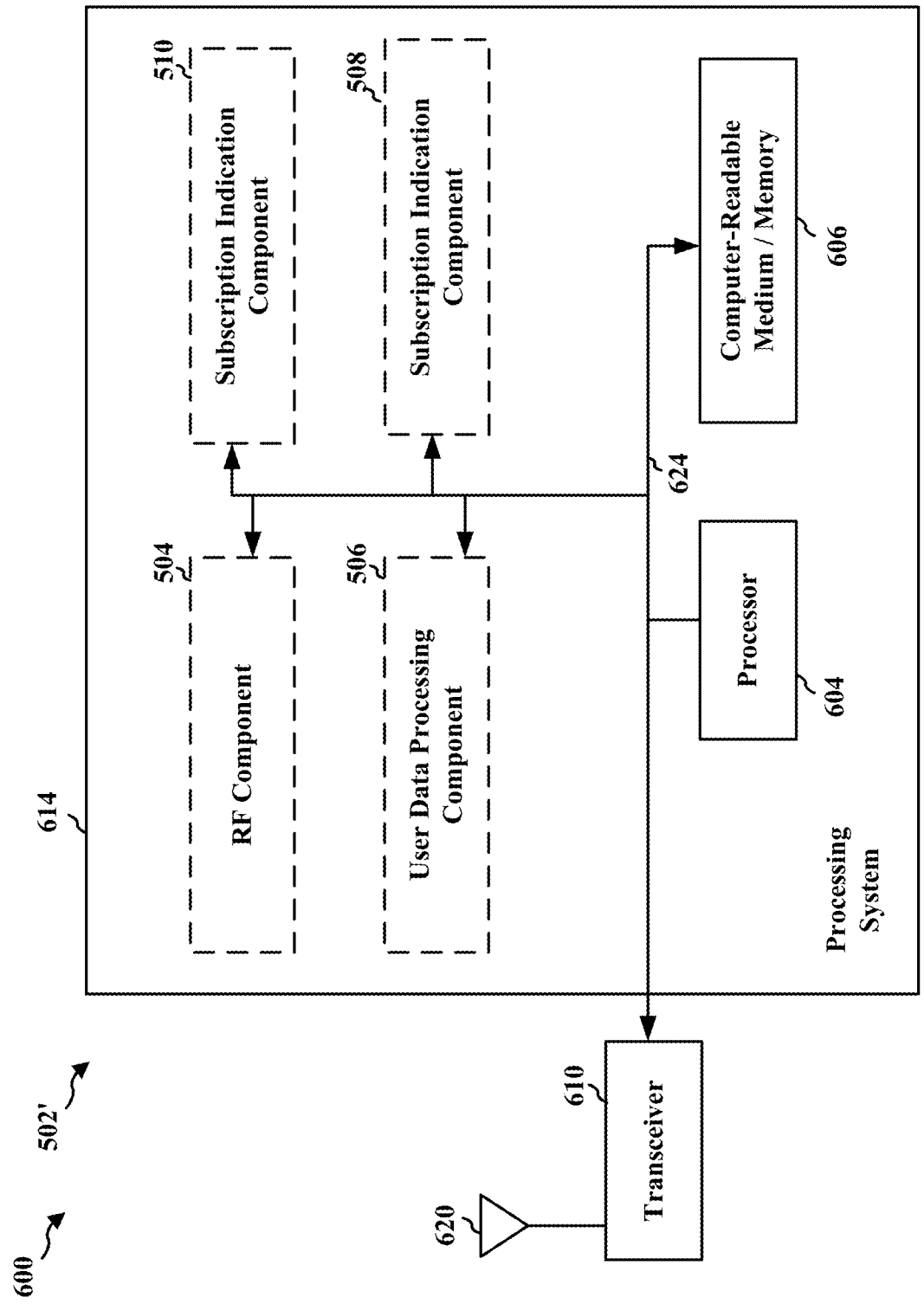
FIG. 6 is a diagram illustrating an example of a hardware implementation for an apparatus employing a processing system according to some embodiments.

FIG. 6 is a diagram 600 illustrating an example of a hardware implementation for an apparatus 602' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, RF component 504, data processing component 506, location indication component 508, subscription indication component 510, and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614. In addition, the transceiver 610 receives information from the processing system 614, and based on the received information, generates a signal to be applied to the one or more antennas 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the components 504, 506, 508, and 510. The components may be software components running in the processor 604, resident/stored in the computer-readable medium/memory 606, one or more hardware components coupled to the processor 604, or some combination thereof. The processing system 614 may be a component of the UE 250 and may include the memory 260 and/or at least one of the TX processor 268, the RX processor 256, and the controller/processor 259.

In one configuration, the apparatus 502/502' for wireless communication includes means for indicating to a network that the UE is associated with a plurality of network subscriptions, the plurality of network subscriptions including at least a first network subscription and a second network subscription; means for transmitting location information using the first network subscription to the network, wherein the location information corresponds to a UE location; and means for receiving data associated with the second subscription from the network, wherein the data is associated with the UE location The aforementioned means may be one or more of the aforementioned components of the apparatus 502 and/or the processing system 614 of the apparatus 502' configured to perform the functions recited by the aforementioned means. As described supra, the processing system 614 may include the TX Processor 268, the RX Processor 256, and the controller/processor 259. As such, in one configuration, the aforementioned means may be the TX Processor 268, the RX Processor 256, and the controller/processor 259 configured to perform the functions recited by the aforementioned means.

Figure 7:
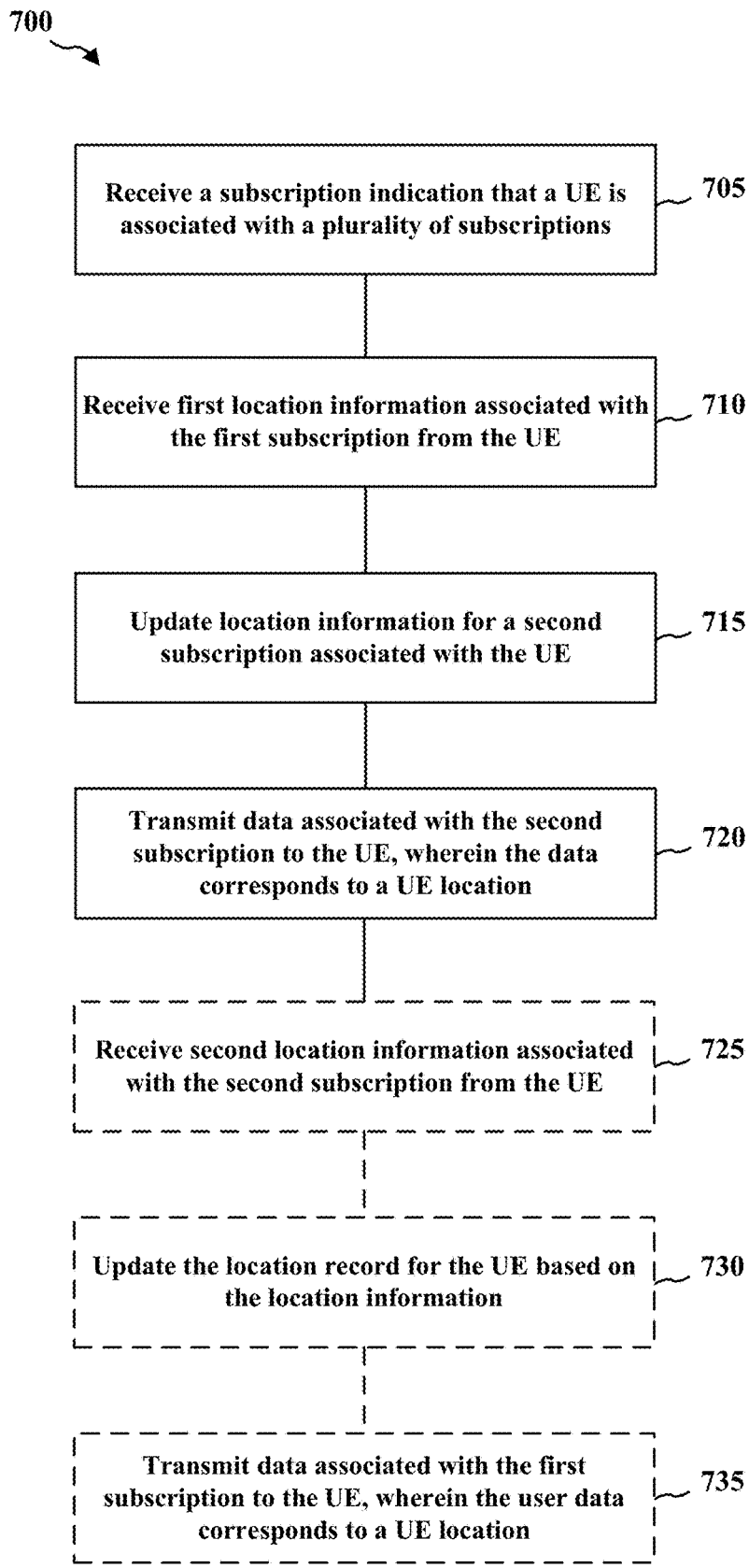
FIG. 7 is a flowchart of a method of wireless communication according to some embodiments.

FIG. 7 is a flowchart 700 of a method of wireless communication. The method may be performed by a base station or network (e.g., the BS 102, 210, 304; the apparatus 802/802'; network MME 162). Optional aspects are illustrated with a dashed line. The method improves communication with a MSIM device by enabling a reduction in power consumption and overhead signaling.

At 705, the base station receives a subscription indication that a UE is associated with a plurality of subscriptions. The plurality of subscriptions may include at least a first subscription and a second subscription. For example, the UE may transmit a subscription indication to the gNB, as illustrated at 305 in FIG. 3. The indication may be transmitted using either the first subscription or the second subscription. The subscription indication may be a MAC CE or RRC IE. Each of the plurality of subscriptions may be associated with a unique subscriber identity (e.g., IMSI), and the UE may have a unique hardware ID (e.g., IMEI). The base station, or MME specifically, may maintain a database associating IMSIs with IMEIs.

At 710, the base station may receive a first location information on the first subscription. The location information may be a TAU or a RNAU. The TAU or RNAU may be transmitted using the first subscription, and may be triggered by a network request, occur in response to a page by the network, or be triggered by UE mobility. For example, the base station may receive a first location information, as illustrated at 310 in FIG. 3.

At 715, the base station may update a location information for a second subscription associated with the UE. This is in addition to updating the location information for the first subscription. That is, any active subscriptions associated with the UE is updated based on the location information. Specifically, the BS may use the database associating IMSIs with IMEIs to identify which subscriptions to update with the received location information. Alternatively, the base station may maintain a single location information database for all the IMSIs associated with a given IMEI.

At 720, the base station may transmit data associated with the second subscription. The data may correspond to a UE location corresponding to the first location information. That is, while the first location information was received using the first subscription, the network updated the context for the second subscription and the transmitted data reflects the update. For example, as illustrated at 315 in FIG. 3, the base station may send control data based on the first location.

At 725, the BS may receive a second location information on the second subscription. The location information may be a TAU or a RNAU. The TAU or RNAU may be transmitted using the second subscription and may be triggered by a network request, may occur in response to a page by the network, or may be triggered by UE mobility. For example, the base station may receive a second location information, as illustrated at 330 in FIG. 3.

At 730, the base station may update a location information for a first subscription associated with the UE. This is in addition to updating the location information for the second subscription. That is, any active subscriptions associated with the UE is updated based on the location information. Specifically, the base station may use the database associating IMSIs with IMEIs to identify which subscriptions to update with the received location information. Alternatively, the base station may maintain a single location information database for all the IMSIs associated with a given IMEI.

At 735, the BS may transmit data associated with the second subscription. The data may correspond to a UE location corresponding to the first location information. That is, while the first location information was received using the first subscription, the network updates the context for the second subscription and the data transmitted to the UE reflects that update. For example, as illustrated at 340 in FIG. 3, the base station may send data (e.g., control data) based on the first location.

Figure 8:
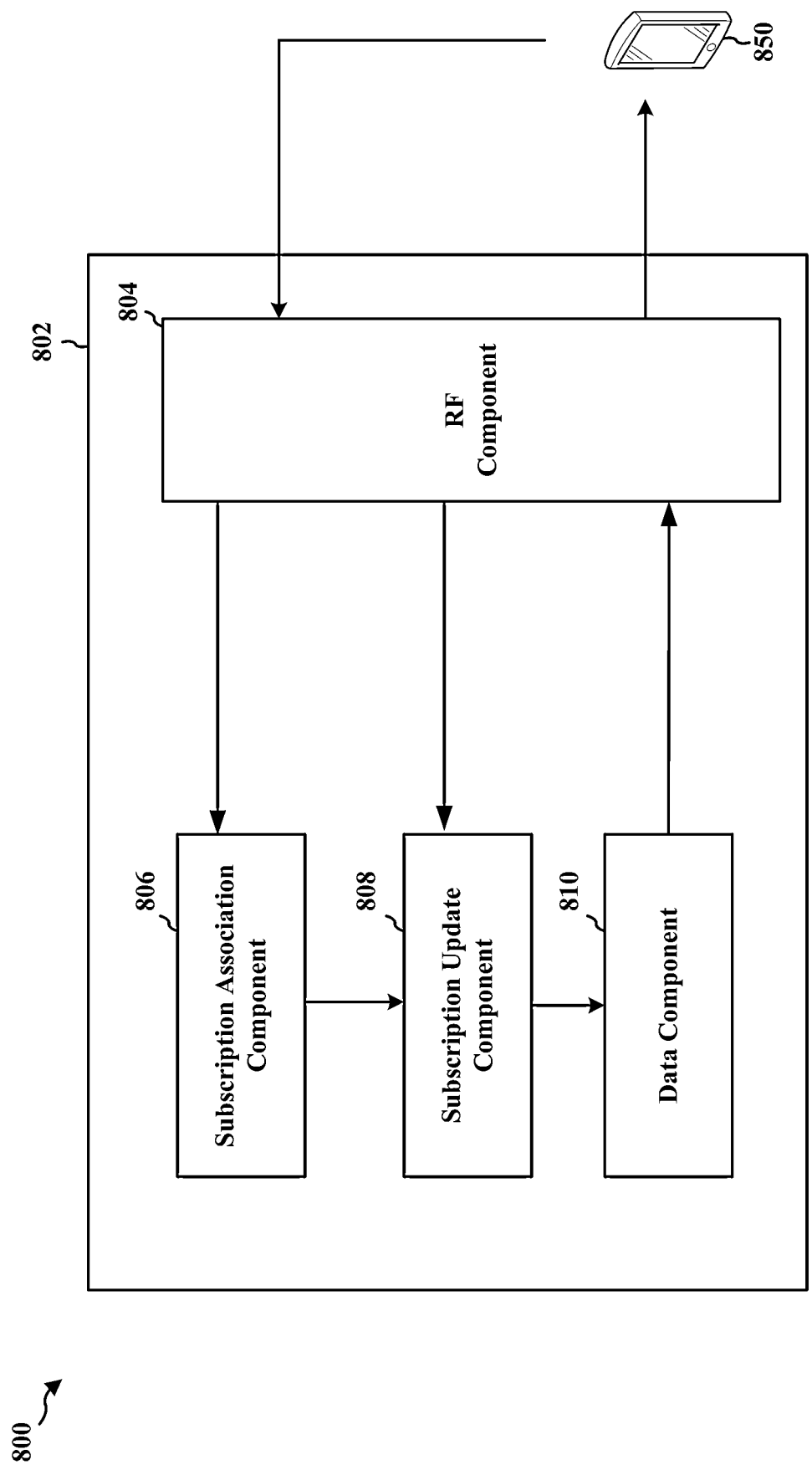
FIG. 8 is a conceptual data flow diagram illustrating the data flow between different means/components according to some embodiments.

FIG. 8 is a conceptual data flow diagram 800 illustrating the data flow between different means/components in an exemplary apparatus 802. The apparatus may be a base station. The apparatus includes a RF Component 804, Subscription Association Component 806, Subscription Update Component 808, and Data Component 810. RF Component 804 transmits control and user data to UE 850 and receives subscription indication (e.g., TAU and/or RNAUs) from UE 850. Subscription Association Component 806 receives subscription indication signaling from UE 850 and associates network subscriptions (e.g., IMSIs) with UE hardware (e.g., using IMEIs). Subscription association component 806 may maintain a database associated IMSIs with IMEIs. Subscription Association Component 806 may also provide a Subscription Update Component 808 with a list of IMSI to update based a received TAU or RNAU. Subscription Update Component 806 updates the subscription context and/or location based on a received TAU or RNAU. This updated context or location may be used by Data Component 810. Data Component 810 may generate UE communication that is updated based on the TAU and RNAU from UE 850. For example, the Data Component 810 may transmit control data, via RF component 804, to UE 850 on any associated subscriptions that are updated based on the latest TAU or RNAU from another subscription.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithms, implemented by a processor configured to perform the stated processes/algorithms, stored within a computer-readable medium for implementation by a processor, or some combination thereof.

Figure 9:
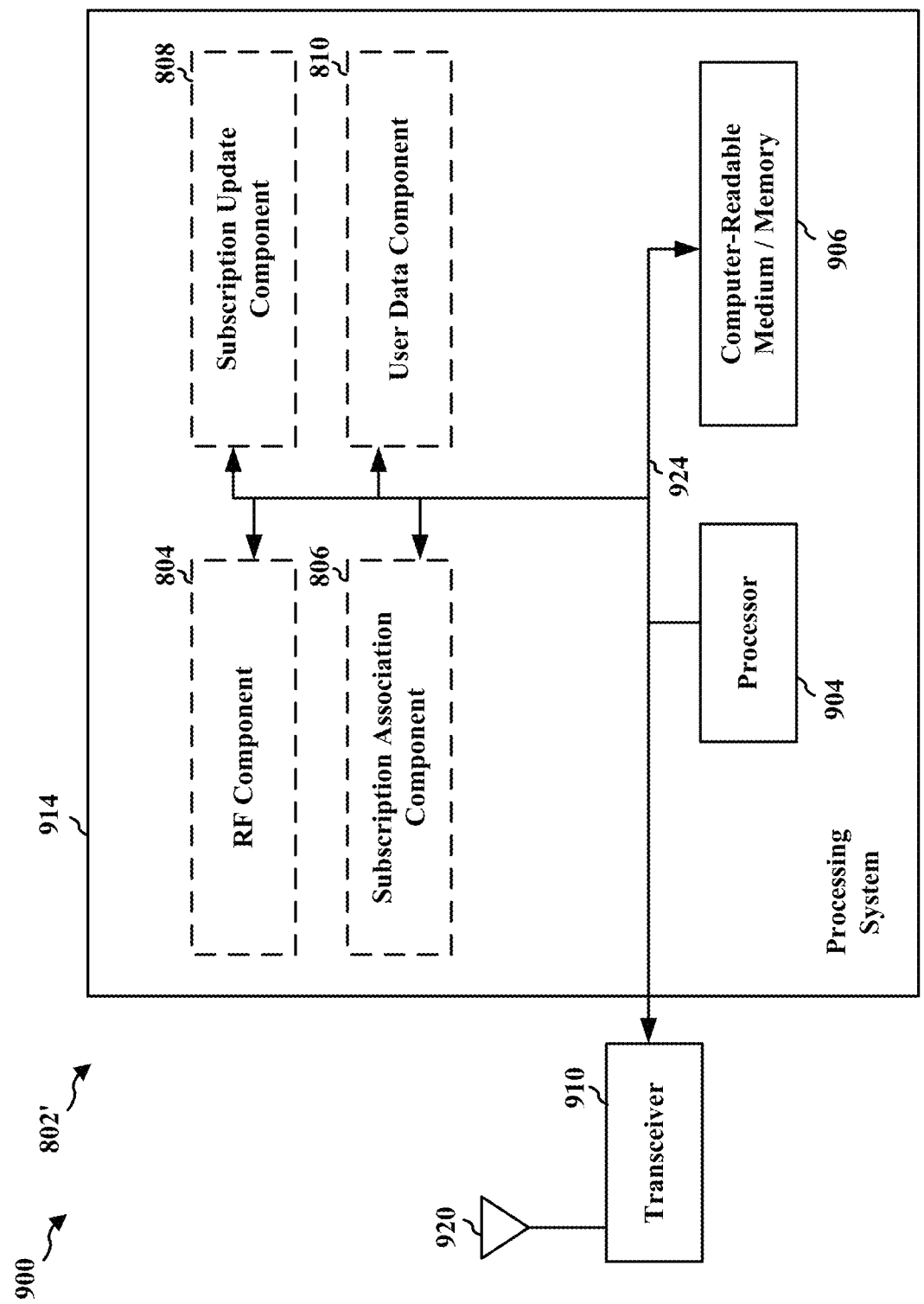
FIG. 9 is a diagram illustrating an example of a hardware implementation for an apparatus employing a processing system according to some embodiments

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914. In addition, the transceiver 910 receives information from the processing system 914, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, and 810. The components may be software components running in the processor 904, resident/stored in the computer-readable medium/memory 906, one or more hardware components coupled to the processor 904, or some combination thereof. The processing system 914 may be a component of the base station 210 and may include the memory 276 and/or at least one of the TX processor 216, the RX processor 270, and the controller/processor 275.

In one configuration, the apparatus 802/802' for wireless communication includes means for receiving an indication from a user equipment (UE) that the UE is associated with a plurality of network subscriptions, the plurality of network subscriptions including at least a first network subscription and a second network subscription; means for receiving location information associated with the first network subscription from the UE; means for updating location information associated with the second subscription based on the location information associated with the first network subscription; and means for transmitting data associated with the second subscription to the UE, wherein the data corresponds to a UE location based on the updated location record. The aforementioned means may be one or more of the aforementioned components of the apparatus 802 and/or the processing system 914 of the apparatus 802' configured to perform the functions recited by the aforementioned means. As described supra, the processing system 914 may include the TX Processor 216, the RX Processor 270, and the controller/processor 275. As such, in one configuration, the aforementioned means may be the TX Processor 216, the RX Processor 270, and the controller/processor 275 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a user equipment (UE), comprising:
   indicating to a network that the UE is associated with a plurality of network subscriptions, the plurality of network subscriptions including at least a first network subscription and a second network subscription;
   transmitting location information using the first network subscription to the network, wherein the location information corresponds to a UE location and wherein the location information is a first location information;
   transmitting a second location information using the second network subscription, subsequent to transmitting the first location information;
   receiving data associated with the first subscription at the UE, wherein the data associated with the first subscription corresponds to the second location information; and
   receiving data associated with the second subscription from the network, wherein the data associated with the second subscription is associated with the UE location.

2. The method of claim 1, wherein the UE is a multi-SIM UE.

3. The method of claim 1, wherein subscription indication comprises a MAC CE or a RRC IE.

4. The method of claim 1, wherein the plurality of network subscriptions include at least one of a 5G subscription and one of an LTE subscription or another 5G subscription.

5. The method of claim 1, wherein each of the plurality of network subscriptions is associated with a unique subscriber identity.

6. The method of claim 1, wherein the UE is associated with a device identity.

7. A method for wireless communication at a network device, comprising:
   receiving a subscription indication from a user equipment (UE), wherein the subscription indication identifies that the UE is associated with a plurality of network subscriptions, the plurality of network subscriptions including at least a first network subscription and a second network subscription;
   receiving location information associated with the first network subscription from the UE, wherein the location information associated with the first network subscription is a first location information;
   updating location information associated with the second subscription based on the location information associated with the first network subscription;
   receiving, subsequent to receiving the first location information, a second location information associated with the second network subscription from the UE;
   updating the location information associated with the first subscription based on the second location information; and
   transmitting data associated with the first subscription to the UE, wherein the data associated with the first subscription corresponds to a UE location based on the updated location information corresponding to the second location information; and
   transmitting data associated with the second subscription to the UE, wherein the data associated with the second subscription corresponds to a UE location based on an updated location record.

8. The method of claim 7, further comprising associating the plurality of network subscriptions with a UE device identity.

9. The method of claim 8, wherein the location record is associated with the UE device identity.

10. The method of claim 7, wherein the UE is a multi-SIM UE.

11. The method of claim 7, wherein subscription indication comprises a MAC CE or a RRC IE.

12. The method of claim 7, wherein the plurality of network subscriptions include at least one of a 5G subscription and one of an LTE subscription or another 5G subscription.

13. The method of claim 7, wherein each of the plurality of network subscriptions is associated with a unique subscriber identity.

14. An apparatus for wireless communication, comprising:
   a memory; and
   at least one processor coupled to the memory and configured to:
      indicate to a network that the UE is associated with a plurality of network subscriptions, the plurality of network subscriptions including at least a first network subscription and a second network subscription;
      transmit location information using the first network subscription to the network, wherein the location information corresponds to a UE location location and wherein the location information is a first location information;

transmit a second location information using the second network subscription, subsequent to transmitting the first location information;

receive data associated with the first subscription at the UE, wherein the data associated with the first subscription corresponds to the second location information; and receive data associated with the second subscription from the network, wherein the data is associated with the UE location.

15. The apparatus of claim 14, wherein the UE is a multi-SIM UE.

16. The apparatus of claim 14, wherein subscription indication comprises a MAC CE or a RRC IE.

17. The apparatus of claim 14, wherein the plurality of network subscriptions include at least one of a 5G subscription and one of an LTE subscription or another 5G subscription.

18. The apparatus of claim 14, wherein each of plurality of network subscriptions is associated with a unique subscriber identity.

19. The apparatus of claim 14, wherein the UE is associated with a device identity.

20. An apparatus for wireless communication, comprising:

a memory; and at least one processor coupled to the memory and configured to:

receive a subscription indication from a user equipment (UE), wherein the subscription indication identifies that the UE is associated with a plurality of network subscriptions, the plurality of network subscriptions including at least a first network subscription and a second network subscription;

receive location information associated with the first network subscription from the UE, wherein the location information associated with the first network subscription is a first location information;

update location information associated with the second subscription based on the location information associated with the first network subscription;

receive, subsequent to receiving the first location information, a second location information associated with the second network subscription from the UE;

update the location information associated with the first subscription based on the second location information; and transmit data associated with the first subscription to the UE, wherein the data associated with the first subscription corresponds to a UE location based on the updated location information corresponding to the second location information; and transmit data associated with the second subscription to the UE, wherein the data corresponds to a UE location based on the updated location record.

21. The apparatus of claim 20, the at least one processor is further configured to associate the plurality of network subscriptions with a UE device identity.

22. The apparatus of claim 20, wherein the location record is associated with the UE device identity.

23. The apparatus of claim 20, wherein the UE is a multi-SIM UE.

24. The apparatus of claim 20, wherein subscription indication comprises a MAC CE or a RRC IE.

25. The apparatus of claim 20, wherein the plurality of network subscriptions include at least one of a 5G subscription and one of an LTE subscription or another 5G subscription.

26. The apparatus of claim 20, wherein each of the plurality of network subscriptions is associated with a unique subscriber identity.

* * * * *